United States Patent
Rathi et al.

(10) Patent No.: US 8,913,653 B2
(45) Date of Patent: Dec. 16, 2014

(54) EFFICIENT EQUALIZER COEFFICIENT COMPUTATION

(71) Applicant: Nvidia Corporation, Santa Clara, CA (US)

(72) Inventors: Vishwambhar Rathi, Bristol (GB); Carlo Luschi, Oxford (GB)

(73) Assignee: Nvidia Corporation, Santa Clara, CA (US)

( * ) Notice: Subject to any disclaimer, the term of this patent is extended or adjusted under 35 U.S.C. 154(b) by 100 days.

(21) Appl. No.: 13/622,911

(22) Filed: Sep. 19, 2012

(65) Prior Publication Data

US 2014/0079110 A1 Mar. 20, 2014

(51) Int. Cl.
*H03H 7/30* (2006.01)
*H04L 27/01* (2006.01)

(52) U.S. Cl.
USPC .......................................... 375/229; 375/232

(58) Field of Classification Search
CPC ................... H04L 25/03191; H04L 25/03197; H04L 25/03286; H04L 25/03891; H04L 2025/03433; H04L 25/03949; H04L 25/03961
USPC .................................................. 375/229–233
See application file for complete search history.

(56) References Cited

U.S. PATENT DOCUMENTS

| | | | |
|---|---|---|---|
| 5,999,349 A * | 12/1999 | Choi | 360/46 |
| 6,195,435 B1 * | 2/2001 | Kitamura | 381/18 |
| 6,341,166 B1 * | 1/2002 | Basel | 381/103 |
| 6,505,222 B1 * | 1/2003 | Davis et al. | 708/323 |
| 7,555,080 B2 * | 6/2009 | Kim | 375/350 |
| 8,559,283 B1 * | 10/2013 | Liu et al. | 369/44.35 |
| 8,644,369 B1 * | 2/2014 | Katic et al. | 375/232 |
| 2004/0052309 A1 * | 3/2004 | Li | 375/232 |
| 2004/0062302 A1 * | 4/2004 | Fujii et al. | 375/232 |
| 2004/0234016 A1 * | 11/2004 | Leblond et al. | 375/350 |
| 2005/0099907 A1 * | 5/2005 | Sawada et al. | 369/47.26 |
| 2006/0109891 A1 * | 5/2006 | Guo et al. | 375/147 |
| 2006/0133471 A1 * | 6/2006 | Ki | 375/232 |
| 2007/0121716 A1 * | 5/2007 | Nagarajan et al. | 375/229 |
| 2008/0304558 A1 * | 12/2008 | Zhu et al. | 375/233 |
| 2009/0129229 A1 * | 5/2009 | Park et al. | 369/59.22 |
| 2010/0014573 A1 * | 1/2010 | Momtaz et al. | 375/231 |
| 2010/0177815 A1 * | 7/2010 | Garg et al. | 375/231 |
| 2012/0201288 A1 * | 8/2012 | Kolze et al. | 375/232 |
| 2012/0219051 A1 * | 8/2012 | Yin et al. | 375/229 |
| 2013/0022090 A1 * | 1/2013 | Weng et al. | 375/219 |

* cited by examiner

*Primary Examiner* — Emmanuel Bayard

(57) ABSTRACT

An equalization parameter analyzer includes a parameter section configured to acquire at least one current parameter for a wireless receiver and an analyzer section configured to compare the at least one current parameter with at least one corresponding previous parameter. Additionally, the equalization parameter analyzer also includes a coefficients section configured to initiate a generation of new equalizer coefficients in the wireless receiver based on a change between the at least one current and corresponding previous parameters that exceeds a predefined threshold. A method of equalization coefficients generation is also provided.

20 Claims, 2 Drawing Sheets

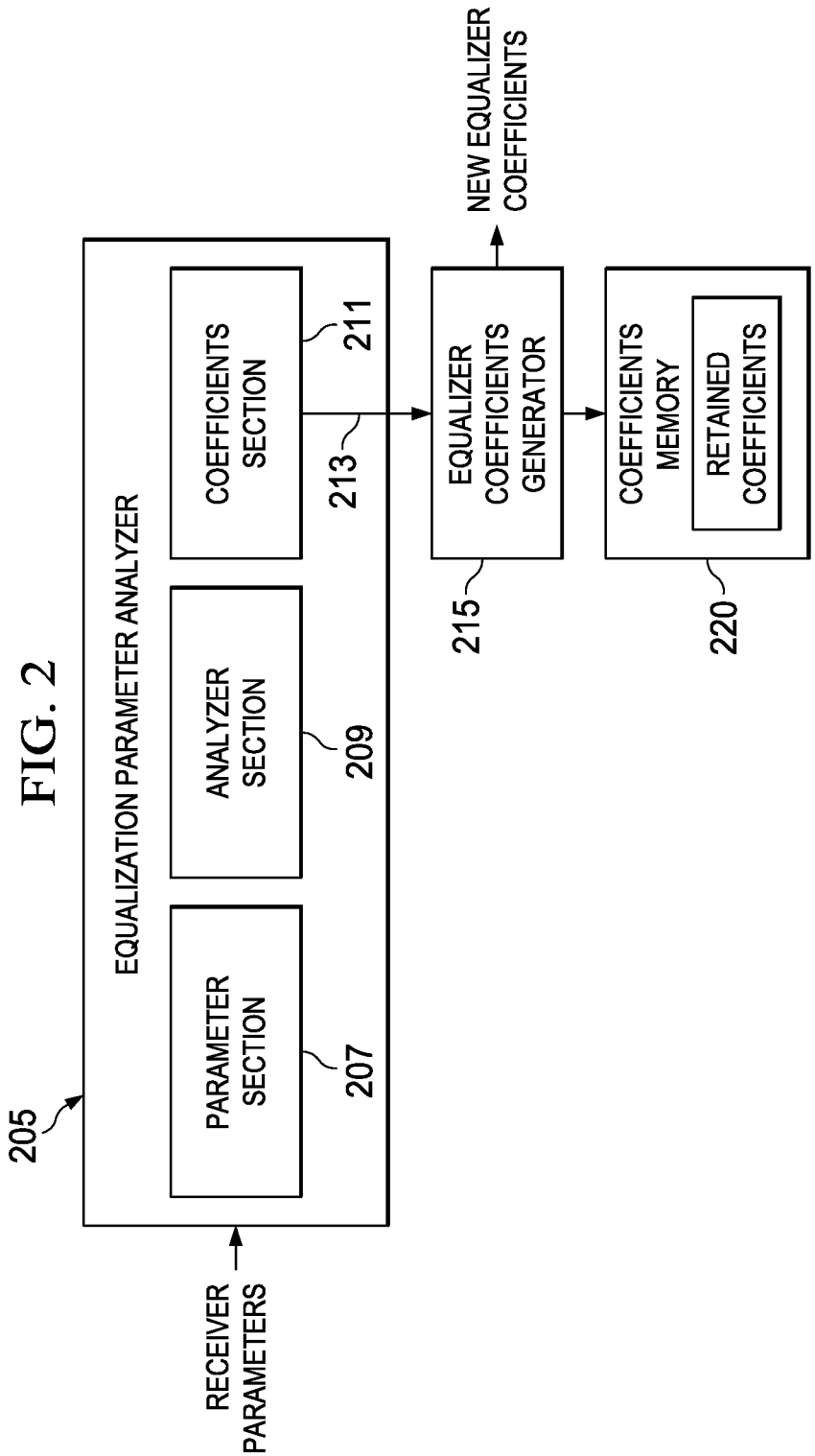

EFFICIENT EQUALIZER COEFFICIENT COMPUTATION

TECHNICAL FIELD

This application is directed, in general, to wireless communications and, more specifically, to an equalization parameter analyzer and a method of equalization coefficients generation.

BACKGROUND

Wireless communications receivers use channel equalization (channel equalizers) to remove the intersymbol interference (ISI) in received data. Signals transmitted over a wireless channel inherently suffer from ISI due to multipath propagation. Thus, a channel equalizer is often a critical component of a wireless receiver in order to achieve high data rates. Several approaches to channel equalization are currently employed. These include Zero Forcing (ZF), Minimum Mean Square Error (MMSE) and Least Squares (LS) equalization. The corresponding calculation of the equalizer coefficients can have a very high computational cost when the required number of coefficients is large. This is typically the case for computing MMSE equalizer coefficients for a multiple-input multiple-output (MIMO) channel having a large number of channel taps, for example. Additionally, in many receiver implementations, computation of the equalizer coefficients or an update of previously computed equalizer coefficients is required at regular intervals, which also typically increases the overall computational cost.

SUMMARY

Embodiments of the present disclosure provide an equalization parameter analyzer and a method of equalization coefficients generation.

In one embodiment, the equalization parameter analyzer includes a parameter section configured to acquire at least one current parameter for a wireless receiver and an analyzer section configured to compare the at least one current parameter with at least one corresponding previous parameter. Additionally, the equalization parameter analyzer also includes a coefficients section configured to initiate a generation of new equalizer coefficients in the wireless receiver based on a change between the at least one current and corresponding previous parameters that exceeds a predefined threshold.

In another aspect, the method of equalization coefficients generation includes acquiring at least one current parameter for a wireless receiver and comparing the at least one current parameter with at least one corresponding previous parameter. The method of equalization coefficients generation also includes initiating a generation of new equalizer coefficients in the wireless receiver based on a change between the at least one current and corresponding previous parameters that exceeds a predefined threshold.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which:

FIG. 2 illustrates a block diagram of an embodiment of a portion of a wireless receiver constructed according to the principles of the present disclosure.

DETAILED DESCRIPTION

The coefficients of a chip level equalizer employed for code division multiple access (CDMA) systems, for example, are computed using one or more of the following parameters associated with a wireless receiver: a channel estimate, a noise plus interference power estimate or other received signal statistics. A zero forcing (ZF) equalizer uses only the channel estimate. However, a minimum mean square error (MMSE) equalizer uses estimates of both the channel and the noise plus interference power. A least square (LS) equalizer uses short term received signal statistics (auto-correlations and cross-correlations) for its coefficient computation.

Embodiments of the present disclosure are based on the realization that computation of the equalizer coefficients need not be performed if the parameters used for coefficient computation (e.g., channel estimate or received signal statistics) have not changed substantially. Additionally, it is recognized that the change in these parameters is likely to be even smaller if the parameters are smoothed by filtering before use for computation of equalizer coefficients. This idea is employed to reduce an implementation cost associated with the equalizer coefficients, which improves implementation efficiency and power savings.

These embodiments may be applied broadly in communications systems to wireless receivers that compute equalizer coefficients. Examples of such receivers include single-input single-output (SISO) receivers, single-input multiple-output (SIMO) receivers, multiple-input single-output (MISO) receivers and multiple-input multiple-output (MIMO) receivers, such as those employed for 3rd generation partnership project (3GPP) high speed packet access (HSPA) or long term evolution (LTE) systems. When computing equalizer coefficients, user equipment (UE) associated with these systems store the corresponding needed parameters.

Figure 1:
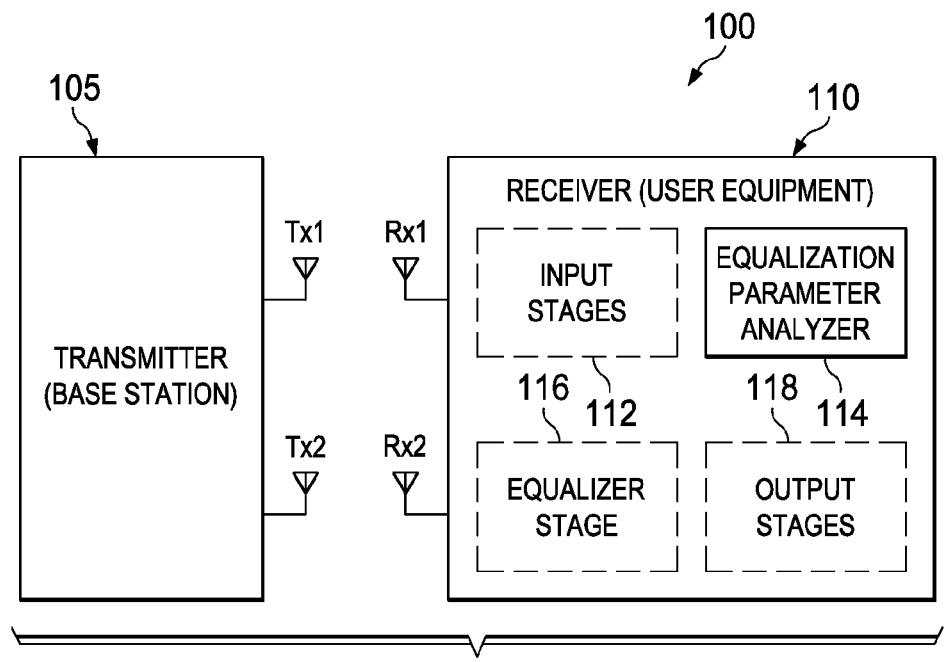
FIG. 1 illustrates an example of a wireless channel constructed according to the principles of the present disclosure.

FIG. 1 illustrates an example of a MIMO channel, generally designated 100, constructed according to the principles of the present disclosure. The MIMO channel 100 includes a base station transmitter 105 having two transmit antennas and a user equipment (UE) receiver 110 having two receive antennas. Here, the case of two transmit and two receive antennas is considered, but the description applies to the general case of $M_T$ transmit antennas and $M_R$ receive antennas, with $M_T \geq 1$, $M_R \geq 1$. The UE receiver 110 includes input stages 112, an equalization parameter analyzer 114, an equalizer stage 116 and output stages 118.

The UE receiver 110 receives wireless transmissions from the base station transmitter 105 through its two receive antennas. The input stages 112 process the wireless transmissions and provide equalization parameters to the equalization parameter analyzer 114. Here, current and corresponding previous equalization parameters are analyzed to determine if new equalizer coefficients are required to process current wireless transmissions. For example, if the equalizer stage 116 employs an MMSE equalizer, the equalization parameter analyzer 114 compares at least the current channel estimate (for which the equalizer coefficients may be computed) and a previous (stored) channel estimate (for which the equalizer coefficients have been computed).

For an MMSE equalizer, the equalization parameter analyzer 114 may also compare the current noise plus interference power estimate (for which the equalizer stage 116 coefficients may be computed) and the stored noise plus interference power estimate (for which the equalizer stage 116 coefficients have been computed). This is done at a next scheduled computation of equalizer coefficients. Depending on the outcome of the above comparison or comparisons, the equalizer stage 116 employs existing or new equalizer coefficients to adequately remove ISI in the current wireless transmissions. The output stages 118 further process and decode the wireless transmissions for use by a user of the UE receiver 110.

FIG. 2 illustrates a block diagram of an embodiment of a portion of a wireless receiver, generally designated 200, constructed according to the principles of the present disclosure. The wireless receiver portion 200 is intended to be generally representative of any wireless receiver employing equalization. Additionally, the parameters discussed within this disclosure are understood to be equalization parameters upon which receiver equalization depends. The wireless receiver portion 200 includes an equalization parameter analyzer 205, which further includes a parameter section 207, an analyzer section 209 and a coefficients section 211. The wireless receiver portion 200 also includes an equalizer coefficients generator 215 and a coefficients memory 220.

The parameter section 207 acquires at least one current parameter for the wireless receiver, and the analyzer section 209 compares the at least one current parameter with at least one corresponding previous parameter. The coefficients section 211 initiates a generation of new equalizer coefficients in the wireless receiver based on a change between the at least one current and corresponding previous parameters that exceeds a predefined threshold. An initiation command is provided over a control connection 213 to the equalizer coefficients generator 215 when the equalizer coefficients generator 215 is required to provide new equalizer coefficients for the wireless receiver. That is, when the change exceeds the predefined threshold. The new equalizer coefficients are also stored in the coefficients memory 220 and serve as retained coefficients for the wireless receiver during a subsequent time when new equalizer coefficients are not required.

In one embodiment, the equalization parameter analyzer 205 computes a difference metric to measure the magnitude of a change between a current channel estimate with respect to a stored corresponding previous channel estimate. The equalization parameter analyzer 205 also computes a difference metric to measure the magnitude of a difference between a current noise plus interference power estimate and a stored noise plus interference power estimate. For example, the equalization parameter analyzer 205 may compute the ratio of the square root of the energy of the difference of channel estimates to the square root of the energy of the current channel estimate, or the ratio of the energy of the difference of channel estimates to the energy of the current channel estimate. The equalization parameter analyzer 205 may also compute the ratio of the absolute value of the difference of noise plus interference power estimates to the current noise plus interference power estimate.

When each of these difference metrics is below a predefined threshold, the equalizer coefficients generator 215 does not compute new equalizer coefficients and continues to use the previously computed coefficients, which have been retained (e.g., in coefficients memory 220). This results in significant computation cost saving where the equalizer coefficient calculation is expensive (e.g., for a MIMO system), while maintaining system performance.

If an LS equalizer is employed, the equalization parameter analyzer 205 stores channel output statistics for the LS equalizer coefficients that have been computed. At the next scheduled computation time for the LS equalizer coefficients, the equalization parameter analyzer 205 computes some norm of the difference between the second order statistics of the current channel output and the second order statistics of the stored channel output. If this difference metric has a magnitude below a predefined threshold, the equalizer coefficients generator 215 does not compute new LS equalizer coefficients and instead employs the stored previous equalizer coefficients.

Again, consider the example of an HSPA or LTE downlink transmission using an MMSE equalizer where the wireless receiver is a UE receiver employing an equalization parameter analyzer such as that of FIG. 1. A difference metric in channel estimates may be obtained by measuring the energy of a difference vector. More precisely, let $h=[h_1 \ldots h_L]^T$ be a current channel estimate, where L is the number of channel taps and $[\bullet]^T$ indicates vector transpose. Let $\bar{h}=[\bar{h}_1 \ldots \bar{h}_L]^T$ be the channel estimate in the previous slot and $d=h-\bar{h}$ be the difference vector of the two channel estimates.

Let a first difference metric $\Delta_h=\|h-\bar{h}\|/\|h\|$, where $\|\bullet\|$ denotes the square root of the energy of a vector. Alternatively, the first difference metric could be given by $\Delta_h=\|h-\bar{h}\|^2/\|h\|^2$, where $\|\bullet\|^2$ denotes the energy of a vector. Then, let N be the noise plus interference power estimate in the current slot and $\bar{N}$ be the noise plus interference power estimate in the previous slot. Let a second difference metric $\Delta_N=|N-\bar{N}|/N$. If $\Delta_h \leq \theta$ and $\Delta_N \leq \mu$, then the equalizer coefficients are not updated, where $\theta$ and $\mu$ are predefined thresholds corresponding to a design requirement, a performance criterion or an environmental constraint. Alternately, the predefined threshold may correspond to a rate of change between at least one current and corresponding previous parameters.

If a zero Forcing (ZF) equalizer is employed, only the condition $\Delta_h \leq \theta$ is checked, since the ZF equalizer does not depend on the estimate of the noise plus interference power. This also may be the case for an MMSE equalizer where the noise power estimate is at a constant level. Of course, other difference metrics may be defined as appropriate to a particular application or condition. It may also be noted that the same methodology can be applied when the calculation of equalizer coefficients is performed in the frequency domain.

Tables 1-6 contain high speed downlink packet access (HSDPA) simulation results for the proposed scheme. All the simulations are for a MIMO channel employing a chip level MMSE equalizer, and the simulations have been run for 2000 frames. The MIMO 'Pipe' channel denotes a full rank additive white Gaussian noise (AWGN) channel. In the simulations, the condition $\Delta_N \leq \mu$ is not considered when deciding if a new set of equalizer coefficients are to be computed, since the noise plus interference power is fixed to a constant value. Correspondingly, only the condition $\Delta_h \leq \theta$ is employed to decide if a new set of equalizer coefficients is required in a current slot.

In Tables 1-6, $BLER_0$ and $T_0$ denote respectively the block error probability and the corresponding data throughput when the equalizer coefficients are computed every slot. Similarly, BLER and T denote respectively the block error probability and the corresponding data throughput when the equalizer coefficients are computed using the proposed scheme. The field "percent of time lazy" is the percentage number of slots when an equalization parameter analyzer decides not to re-compute the equalizer coefficients. It may be noted that the percent of time lazy generally increases as the cell geometry $I_{or}/I_{oc}$ (i.e., the ratio between the total transmitted downlink power and the noise plus interference power) increases, and particularly increases when the predefined value $\theta$ also increases.

TABLE 1

$\theta = 0.1$, MIMO Pipe Channel, AFC off, Frequency Error = 10 Hz

| Ior/Ioc (dB) | $BLER_0$ | BLER | $BLER - BLER_0$ | $T_0$ (kbps) | T (kbps) | $T - T_0$ (kbps) | Percent of Time Lazy |
|---|---|---|---|---|---|---|---|
| −5.0 | 0.2747 | 0.2747 | 0.0000 | 664.11 | 664.11 | 0.0 | 0.0 |
| 0.0 | 0.4220 | 0.4204 | −0.0016 | 1904.95 | 1909.59 | 4.64 | 1.91 |
| 5.0 | 0.0336 | 0.0326 | −0.0010 | 6252.67 | 6349.28 | 96.6 | 16.5 |
| 10.0 | 0.0420 | 0.0437 | 0.0016 | 11398.77 | 11396.54 | −2.3 | 26.2 |
| 15.0 | 0.0550 | 0.0562 | 0.0012 | 17628.29 | 17607.32 | −20.97 | 28.7 |
| 20.0 | 0.0368 | 0.0431 | 0.0062 | 21797.67 | 21642.76 | −154.92 | 30.0 |
| 25.0 | 0.0430 | 0.0463 | 0.0032 | 23065.01 | 22938.98 | −126.03 | 29.9 |
| 30.0 | 0.0444 | 0.0487 | 0.0043 | 23433.59 | 23352.30 | −81.29 | 30.1 |

TABLE 2

$\theta = 0.2$, MIMO Pipe Channel, AFC off, Frequency error = 10 Hz

| Ior/Ioc (dB) | $BLER_0$ | BLER | $BLER - BLER_0$ | $T_0$ (kbps) | T (kbps) | $T - T_0$ (kbps) | Percent of Time Lazy |
|---|---|---|---|---|---|---|---|
| −5.0 | 0.2747 | 0.2747 | 0.0 | 664.11 | 664.11 | 0.0 | 0.0 |
| 0.0 | 0.4220 | 0.4225 | 0.0004 | 1904.95 | 1900.70 | −4.24 | 24.57 |
| 5.0 | 0.0336 | 0.0326 | −0.0010 | 6252.68 | 6253.91 | 1.23 | 49.43 |
| 10.0 | 0.0420 | 0.0477 | 0.0057 | 11398.77 | 11337.22 | −61.55 | 59.39 |
| 15.0 | 0.0550 | 0.0791 | 0.0240 | 17628.29 | 17098.76 | −529.53 | 60.60 |
| 20.0 | 0.0368 | 0.0675 | 0.0307 | 21797.67 | 21020.97 | −776.70 | 60.91 |
| 25.0 | 0.0430 | 0.0956 | 0.0525 | 23065.01 | 21622.6 | −1442.42 | 61.27 |
| 30.0 | 0.0444 | 0.1044 | 0.0599 | 23433.59 | 21842.03 | −1591.56 | 61.43 |

TABLE 3

$\theta = 0.1$, MIMO Pipe Channel, AFC on, Frequency Error = 10 Hz

| Ior/Ioc (dB) | $BLER_0$ | BLER | $BLER - BLER_0$ | $T_0$ (kbps) | T (kbps) | $T - T_0$ (kbps) | Percent of Time Lazy |
|---|---|---|---|---|---|---|---|
| −5.0 | 0.2698 | 0.2697 | 0.0 | 708.86 | 708.86 | 0.0 | 0.0 |
| 0.0 | 0.4256 | 0.4289 | 0.0033 | 1944.44 | 1960.91 | 16.46 | 5.59 |
| 5.0 | 0.0444 | 0.0433 | −0.0011 | 6437.23 | 6471.15 | 33.91 | 41.38 |
| 10.0 | 0.0668 | 0.0664 | −0.0004 | 12322.75 | 12342.53 | 19.78 | 69.27 |
| 15.0 | 0.0549 | 0.0546 | −0.0003 | 20781.67 | 20762.15 | −19.52 | 71.69 |
| 20.0 | 0.0412 | 0.0364 | −0.0047 | 25193.48 | 25332.24 | 138.76 | 73.81 |
| 25.0 | 0.0440 | 0.0433 | −0.0007 | 26459.08 | 26488.57 | 29.49 | 75.75 |
| 30.0 | 0.0358 | 0.0353 | −0.0005 | 26866.50 | 26873.78 | 7.28 | 78.13 |

TABLE 4

$\theta = 0.2$, MIMO Pipe Channel, AFC on, Frequency Error = 10 Hz

| Ior/Ioc (dB) | $BLER_0$ | BLER | $BLER - BLER_0$ | $T_0$ (kbps) | T (kbps) | $T - T_0$ (kbps) | Percent of Time Lazy |
|---|---|---|---|---|---|---|---|
| −5.0 | 0.2697 | 0.02697 | 0.0 | 708.86 | 708.86 | 0.0 | 0.03 |
| 0.0 | 0.4256 | 0.4264 | 0.0008 | 1944.44 | 1954.15 | 9.7 | 45.55 |
| 5.0 | 0.0444 | 0.0407 | −0.0037 | 6437.23 | 6771.27 | 334.03 | 74.93 |
| 10.0 | 0.0668 | 0.0673 | 0.0005 | 12322.75 | 12318.43 | −4.32 | 75.2 |
| 15.0 | 0.0549 | 0.0544 | −0.0005 | 20781.67 | 20772.86 | −8.81 | 75.26 |
| 20.0 | 0.0412 | 0.0393 | −0.0018 | 25193.48 | 25253.16 | 59.67 | 76.12 |
| 25.0 | 0.0440 | 0.0463 | 0.0023 | 26459.08 | 26398.29 | −60.78 | 78.43 |
| 30.0 | 0.0358 | 0.0364 | 0.0005 | 26866.50 | 26838.37 | −28.12 | 80.76 |

TABLE 5

θ = 0.1, MIMO PA3 Channel

| Ior/Ioc (dB) | $BLER_0$ | BLER | BLER − $BLER_0$ | $T_0$ (kbps) | T (kbps) | T − $T_0$ (kbps) | Percent of Time Lazy |
|---|---|---|---|---|---|---|---|
| −5.0 | 0.3024 | 0.3024 | 0.0 | 721.35 | 721.35 | 0.0 | 0.0 |
| 0.0 | 0.3012 | 0.3004 | −0.0007 | 1619.01 | 1633.87 | 14.86 | 1.14 |
| 5.0 | 0.2390 | 0.2378 | −0.0012 | 3777.09 | 3786.51 | 9.41 | 10.2 |
| 10.0 | 0.1346 | 0.1381 | 0.0035 | 7436.54 | 7433.06 | −3.47 | 18.66 |
| 15.0 | 0.1157 | 0.1161 | 0.0003 | 11449.68 | 11443.02 | −6.66 | 24.93 |
| 20.0 | 0.1198 | 0.1198 | 0.0 | 14046.18 | 14002.08 | −24.10 | 26.71 |
| 25.0 | 0.1284 | 0.1293 | 0.0009 | 15125.16 | 15103.04 | −22.12 | 26.89 |
| 30.0 | 0.1355 | 0.1319 | −0.0035 | 15437.13 | 15445.16 | 8.03 | 26.68 |

TABLE 6

θ = 0.2, MIMO PA3 Channel

| Ior/Ioc (dB) | $BLER_0$ | BLER | BLER − $BLER_0$ | $T_0$ (kbps) | T (kbps) | T − $T_0$ (kbps) | Percent of Time Lazy |
|---|---|---|---|---|---|---|---|
| −5.0 | 0.3024 | 0.3009 | −0.0015 | 721.35 | 720.75 | −0.60 | 0.54 |
| 0.0 | 0.3012 | 0.2981 | −0.0030 | 1619.01 | 1639.19 | 20.17 | 18.43 |
| 5.0 | 0.2390 | 0.2372 | −0.0017 | 3777.09 | 3752.27 | −24.81 | 50.20 |
| 10.0 | 0.1346 | 0.1364 | 0.0017 | 7436.54 | 7419.82 | −16.72 | 67.71 |
| 15.0 | 0.1157 | 0.1213 | 0.0056 | 11449.68 | 11159.96 | −289.71 | 73.25 |
| 20.0 | 0.1198 | 0.1316 | 0.0118 | 14046.18 | 13510.11 | −536.07 | 74.54 |
| 25.0 | 0.1284 | 0.1432 | 0.0147 | 15125.16 | 14465.88 | −659.28 | 74.22 |
| 30.0 | 0.1355 | 0.1511 | 0.0155 | 15437.13 | 14832.69 | −604.43 | 75.03 |

Figure 3:
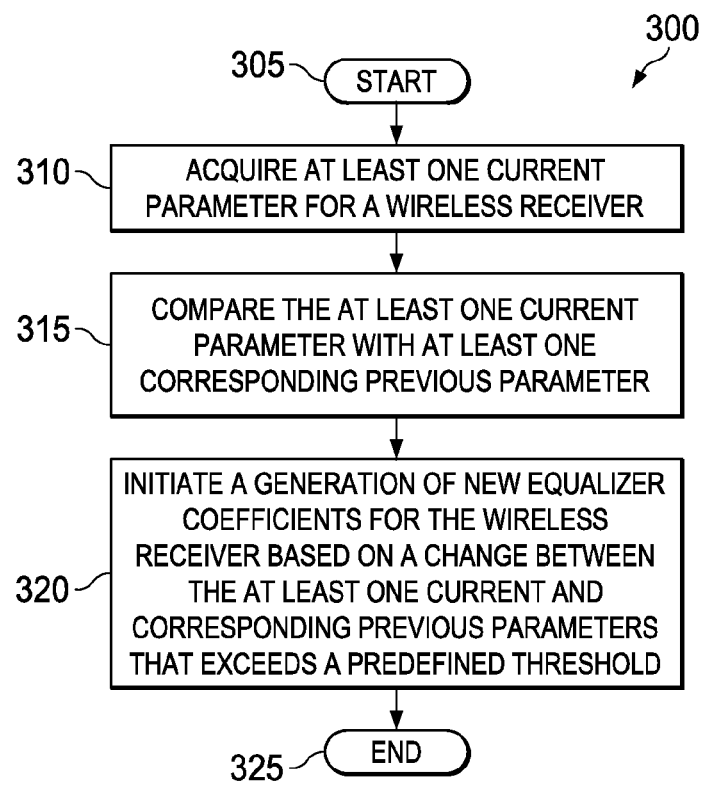
FIG. 3 illustrates a flow diagram of an embodiment of a method of equalization coefficients generation carried out according to the principles of the present disclosure.

FIG. 3 illustrates a flow diagram of an embodiment of a method of equalization coefficients generation, generally designated 300, carried out according to the principles of the present disclosure. The method 300 starts in a step 305, and at least one current parameter for a wireless receiver is acquired in a step 310. Then, the at least one current parameter is compared with at least one corresponding previous parameter in a step 315. A generation of new equalizer coefficients in the wireless receiver is initiated based on a change between the at least one current and corresponding previous parameters that exceeds a predefined threshold, in a step 320.

In one embodiment, the predefined threshold is based on one selected from the group consisting of a design requirement, a performance criterion and an environmental constraint. In another embodiment, the predefined threshold corresponds to a rate of the change between the at least one current and corresponding previous parameters.

In yet another embodiment a difference metric is used to measure the change between the at least one current and corresponding previous parameters. In one case, the difference metric is proportional to a ratio of the square root of the energy of the difference between the at least one current and corresponding previous parameters and the square root of the energy of the at least one current parameter. In another case, the difference metric is proportional to a ratio of the energy of the difference between the at least one current and corresponding previous parameters and the energy of the at least one current parameter. In yet another case, the difference metric is proportional to a ratio of the absolute value of the difference between the at least one current and corresponding previous parameters and the at least one current parameter. In a different case, the difference metric is proportional to a norm of the difference between the at least one current and corresponding previous parameters and a norm of the at least one current parameter.

In still another embodiment, the at least one current and corresponding previous parameters are selected from the group consisting of a channel estimate, a noise plus interference power estimate and short-term received signal statistics. In one example, the new equalizer coefficients are generated for an equalizer employing a zero forcing (ZF) equalizer, a minimum mean square error (MMSE) equalizer or a least squares (LS) equalizer. Correspondingly, the new equalizer coefficients are generated in one selected from the group consisting of a single-input single-output (SISO) receiver, a single-input multiple-output (SIMO) receiver, a multiple-input single-output (MISO) receiver and a multiple-input multiple-output (MIMO) receiver. The method 300 ends in a step 325.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. An equalization parameter analyzer, comprising:
  a parameter section configured to acquire at least one current parameter for a wireless receiver of a user equipment;
  an analyzer section configured to compare the at least one current parameter with at least one corresponding previous parameter; and
  a coefficients section configured to:
    initiate a generation of new equalizer coefficients in the wireless receiver when a change between the at least one current and corresponding previous parameters exceeds a predefined threshold; and reuse previously computed equalizer coefficients in the wireless receiver when the change between the at least one current and corresponding previous parameters is less than the predefined threshold.

2. The analyzer as recited in claim 1 wherein the predefined threshold is based on one selected from the group consisting of:
   a design requirement;
   a performance criterion; and
   an environmental constraint.

3. The analyzer as recited in claim 1 wherein the predefined threshold corresponds to a rate of the change between the at least one current and corresponding previous parameters.

4. The analyzer as recited in claim 1 wherein a difference metric is used to measure the change between the at least one current and corresponding previous parameters.

5. The analyzer as recited in claim 4 wherein the difference metric is proportional to a ratio of the square root of the energy of the difference between the at least one current and corresponding previous parameters and the square root of the energy of the at least one current parameter.

6. The analyzer as recited in claim 4 wherein the difference metric is proportional to a ratio of the energy of the difference between the at least one current and corresponding previous parameters and the energy of the at least one current parameter.

7. The analyzer as recited in claim 4 wherein the difference metric is proportional to a ratio of the absolute value of the difference between the at least one current and corresponding previous parameters and the at least one current parameter.

8. The analyzer as recited in claim 4 wherein the difference metric is proportional to a ratio of a norm of the difference between the at least one current and corresponding previous parameters and a norm of the at least one current parameter.

9. The analyzer as recited in claim 1 wherein the at least one current and corresponding previous parameters are selected from the group consisting of:
   a channel estimate;
   a noise plus interference power estimate; and
   short-term received signal statistics.

10. The analyzer as recited in claim 1 wherein the new equalizer coefficients are generated in one selected from the group consisting of:
    a single-input single-output (SISO) receiver;
    a single-input multiple-output (SIMO) receiver;
    a multiple-input single-output (MISO) receiver; and
    a multiple-input multiple-output (MIMO) receiver.

11. A method of equalization coefficients generation, comprising:
    acquiring at least one current parameter for a wireless receiver of a user equipment;
    comparing the at least one current parameter with at least one corresponding previous parameter;
    initiating a generation of new equalizer coefficients in the wireless receiver when a change between the at least one current and corresponding previous parameters exceeds a predefined threshold; and
    reusing previously computed equalizer coefficients in the wireless receiver when the change between the at least one current and corresponding previous parameters is less than the predefined threshold.

12. The method as recited in claim 11 wherein the predefined threshold is based on one selected from the group consisting of:
    a design requirement;
    a performance criterion; and
    an environmental constraint.

13. The method as recited in claim 11 wherein the predefined threshold corresponds to a rate of the change between the at least one current and corresponding previous parameters.

14. The method as recited in claim 11 wherein a difference metric is used to measure the disparity between the at least one current and corresponding previous parameters.

15. The method as recited in claim 14 wherein the difference metric is proportional to a ratio of the square root of the energy of the difference between the at least one current and corresponding previous parameters and the square root of the energy of the at least one current parameter.

16. The method as recited in claim 14 wherein the difference metric is proportional to a ratio of the energy of the difference between the at least one current and corresponding previous parameters and the energy of the at least one current parameter.

17. The method as recited in claim 14 wherein the difference metric is proportional to a ratio of the absolute value of the difference between the at least one current and corresponding previous parameters and the at least one current parameter.

18. The method as recited in claim 14 wherein the difference metric is proportional to a ratio of a norm of the difference between the at least one current and corresponding previous parameters and a norm of the at least one current parameter.

19. The method as recited in claim 11 wherein the at least one current and corresponding previous parameters are selected from the group consisting of:
    a channel estimate;
    a noise plus interference power estimate; and
    short-term received signal statistics.

20. The method as recited in claim 11 wherein the new equalizer coefficients are generated in one selected from the group consisting of:
    a single-input single-output (SISO) receiver;
    a single-input multiple-output (SIMO) receiver;
    a multiple-input single-output (MISO) receiver; and
    a multiple-input multiple-output (MIMO) receiver.

* * * * *